(No Model.)

J. B. & H. H. McCARTNEY.
CAR COUPLING.

No. 249,653. Patented Nov. 15, 1881.

Witnesses
Fred. G. Dietrich
A. H. Krause

Inventors
Jas. B. McCartney
Henry H. McCartney
By W. B. Richards
atty.

N. PETERS, Photo-Lithographer, Washington, D. C.

UNITED STATES PATENT OFFICE.

JAMES B. McCARTNEY AND HENRY H. McCARTNEY, OF VILLISCA, IOWA.

CAR-COUPLING.

SPECIFICATION forming part of Letters Patent No. 249,653, dated November 15, 1881.

Application filed November 29, 1880. (No model.)

*To all whom it may concern:*

Be it known that we, JAMES B. MCCARTNEY and HENRY H. MCCARTNEY, citizens of the United States, residing at Villisca, in the county of Montgomery and State of Iowa, have invented certain new and useful Improvements in Railway-Car Couplings; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1:
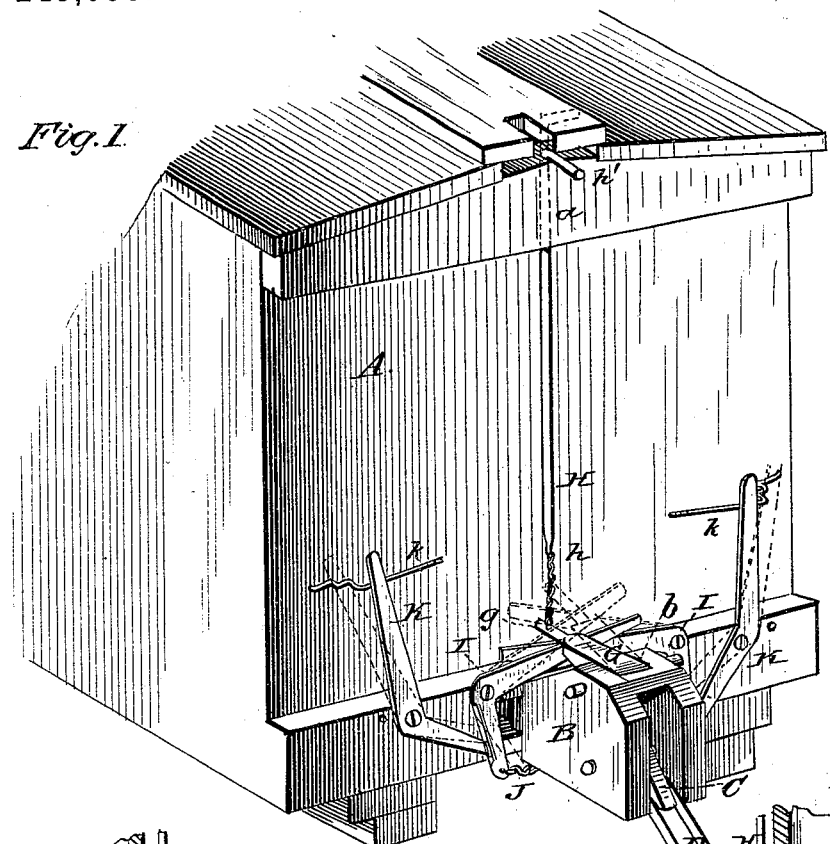
Figure 3:
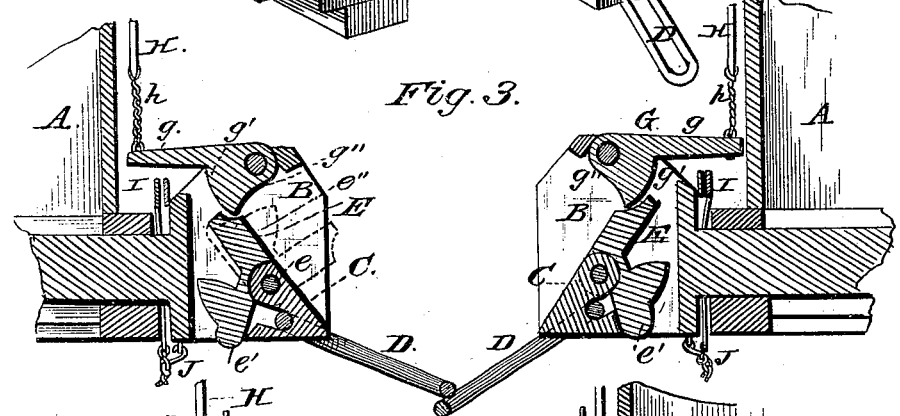
Figure 2:
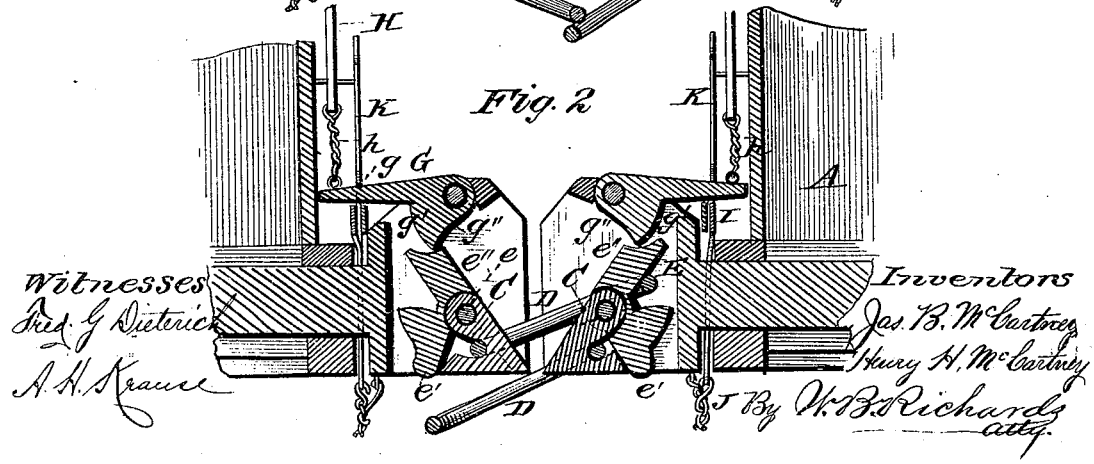

Figure 1 is a perspective of one end of a railway-car, showing our improvement. Fig. 2 is a sectional elevation of two draw-bar heads coupled. Fig. 3 is a sectional elevation of two draw-bar heads as they approach to couple.

This invention relates to railway-car couplings; and the invention consists in improvements in constructions and combinations of parts hereinafter described, and set forth in the claims hereto annexed.

Referring to the drawings by letters, the same letter indicating the same part in the different figures, letter A represents one end of an ordinary railway box-car.

B is a draw-bar head open at its front end, and with an opening, $b$, in its upper side.

C is a hook, projecting upward and rearward from the front end of the bottom wall of the head B in such manner that its rear side forms a hook and its front side an inclined plane, as shown at Figs. 2 and 3.

D is an ordinary coupling-link, one of which is carried by each draw-head and supported therein by the hook C in such manner that the link projects forward and downward from the draw-head to form an inclined plane, as shown at Fig. 3.

E is a tilting hook pivoted at $e$ to the upper end of the fixed hook C, and has a weighted projection, $e'$, at its rear side and lower end. The hook E, when turned forward, as shown by dotted lines at Fig. 3, will overcome the weight of the projection $e'$ and remain in said position until moved, but when turned slightly rearward its gravity will turn it downward until it strikes the bottom of the draw-head, and in so doing will turn the hook upward and rearward into the position shown at Fig. 2. When the hook E is turned rearward, as last described, its front side, $e''$, will form an inclined plane about in same oblique plane as the front side of the hook C and the link D.

G is a dog or detent journaled at its front end to the front end of the draw-head, and its rear end, $g$, extended so that its weight will hold the dog in a normal position, as shown at Figs. 2 and 3 by full lines. The dog G has a projection, $g'$, on its under side and preferably slightly in rear of its pivotal point. The front side, $g''$, of the projection $g'$ is preferably slightly concave.

H is a rod attached to the end of the car so that it may be raised and lowered or reciprocated, and is connected at its lower end by a chain, $h$, to the rear end, $g$, of the dog G. The upper end of the rod H passes through a slot, $a$, in the car-roof foot-board, or it may be a slot in a projecting plate of any kind, and it (the rod) is bent at right angles to form an arm or handle, $h'$. When the rod H is in the position shown by full lines at Fig. 1 it will not affect the dog G, but by drawing it (the rod H) upward the rear end, $g$, of the dog will be elevated, and may be held in such elevated position by turning the rod H so that the handle $h'$ will rest on the roof of the car, as shown by dotted lines at same figure.

An elbow-lever, I, is placed on each side of the draw-head, each journaled at its bend to the car, and the upper end of each extending inward and beneath the rear end, $g$, of the dog G, which is of such weight as to hold the levers in the positions shown at Fig. 1. Chains J connect the lower ends of the levers I with the draw-head and limit the descent of oscillation of their upper ends. Levers K are also pivoted to the car-end, with their lower ends resting respectively against the lower ends of the levers I, so that their upper ends may be drawn outward, as shown by dotted lines at Fig. 1, to press their lower ends against the lower ends of the levers I to raise the upper ends of said levers I, and thereby raise the end $g$ of the dog G. The levers K may be locked behind catches $k$ to hold the dog G in an elevated position at its end $g$. As the draw-heads are brought together whichever inclined link D is highest at its lower end will strike the upper side of the other link and be guided upward thereby until it enters the draw-head and strikes the front inclined side of the hook C, up which it will slide until it strikes the inclined side of the hook E, up which it will slide (if said hook E is in the position shown at Fig. 2) until its forward end strikes the confronting side of the projection g', and thereby raises the end g of the dog G and allows the projection g' to swing backward and the coupling-link to pass and fall over the hook E, when the dog G returns to its normal position, with the end of the projection g' resting on the concave end of the hook E, and thereby holding it (the hook) from tilting forward until the dog G is again raised at its rear end and the projection g' thereby thrown rearward out of the way. When the dog G is raised at its rear end by the rod H or by the levers I K any draft on the coupling-link may then tilt the hook E forward, as shown by dotted lines at Fig. 2, and permit the link to escape and uncouple the draw-heads. If the coupling is effected when the hook E is tilted forward, as last described, then the coupling-link will strike it in its ascent up the hook C and tilt it backward to its full-line position. In tilting the hook E rearward its upper end will strike the projection g' of the dog G and oscillate it backward, and thus allow the hook to pass back beneath it, where it will be held, as hereinbefore described. Should a car be thrown from the track, in turning over it would raise the rear end of the dog G, and thereby uncouple it from the next car.

The draw-heads may be brought together without coupling by holding the dog G from engagement with the hook E by means of the rod H or levers I K, as hereinbefore described.

The two sides of each link form guards for the forward rounded end of the link which slides up the other link, and prevents it from sliding off at either side before it enters the mouth of the draw-head.

What we claim as new is—

1. In a car-coupling, in combination with the draw-head, hook C, and link D, the tilting hook E, journaled to the hook C and adapted to engage the link, substantially as and for the purpose specified.

2. In a car-coupling, in combination with the draw-head and with a coupling-link held by a fixed hook in and projecting therefrom in an inclined position, a tilting hook pivoted to the fixed hook, and adapted to engage the coupling-link when guided thereto by the inclined link and hook E.

3. In a car-coupling, in combination with the fixed hook C and tilting hook E, journaled thereto and adapted to act as a guide for the link D, the dog G, having a projection, g', adapted to hold the hook E from turning, and a rear extension, g, which, by gravity, holds the projection g' on the hook, and may be turned upward to release the hook, substantially as and for the purpose specified.

4. In a car-coupling, in combination with the fixed hook C and the dog G, constructed substantially as described, the tilting hook E, journaled to the hook C and provided with a weighted end to tilt it rearward, substantially as and for the purpose specified.

5. The sliding rod H, in combination with the dog G and tilting hook E, substantially as and for the purpose specified.

6. The combination, with the tilting hook E and link D and dog G, of a sliding rod, H, having its upper end bent and adapted to engage with the car-roof, substantially as and for the purpose specified.

7. The levers K, in combination with the levers I, dog G, and tilting hook E, substantially as and for the purpose specified.

In testimony whereof we affix our signatures in presence of two witnesses.

JAMES B. McCARTNEY.
HENRY H. McCARTNEY.

Witnesses:
L. W. CHILDS,
F. L. INGMAN.